US007921312B1

(12) United States Patent
Pennanen et al.

(10) Patent No.: US 7,921,312 B1
(45) Date of Patent: Apr. 5, 2011

(54) SYSTEM AND METHOD FOR PROVIDING ADAPTIVE VOLTAGE SCALING WITH MULTIPLE CLOCK DOMAINS INSIDE A SINGLE VOLTAGE DOMAIN

(75) Inventors: Juha Pennanen, Oulu (FI); Pasi Salmi, Kemi (FI)

(73) Assignee: National Semiconductor Corporation, Santa Clara, CA (US)

( * ) Notice: Subject to any disclaimer, the term of this patent is extended or adjusted under 35 U.S.C. 154(b) by 817 days.

(21) Appl. No.: 11/900,977

(22) Filed: Sep. 14, 2007

(51) Int. Cl.
*G06F 1/26* (2006.01)
*G06F 1/32* (2006.01)

(52) U.S. Cl. ........ 713/300; 713/320; 713/330; 713/340; 327/524; 327/530

(58) Field of Classification Search .................. 713/300, 713/320, 330, 340; 327/524, 530
See application file for complete search history.

(56) References Cited

U.S. PATENT DOCUMENTS

| | | | |
|---|---|---|---|
| 4,068,159 A | 1/1978 | Gyugyi | |
| 4,231,335 A | 11/1980 | Hallberg et al. | |
| 4,649,334 A | 3/1987 | Nakajima | |
| 4,829,268 A | 5/1989 | Leuthold et al. | |
| 5,166,959 A | 11/1992 | Chu et al. | |
| 5,264,745 A | 11/1993 | Woo | |
| 5,444,381 A | 8/1995 | Locher et al. | |
| 5,594,324 A | 1/1997 | Canter et al. | |
| 5,638,005 A | 6/1997 | Rajan et al. | |
| 5,812,860 A | 9/1998 | Horden et al. | |
| 5,867,012 A | 2/1999 | Tuthill | |
| 5,926,044 A | 7/1999 | Niimura | |
| 5,929,622 A | 7/1999 | Kardash | |
| 5,941,631 A | 8/1999 | Hsu | |
| 5,943,227 A | 8/1999 | Bryson et al. | |
| 5,969,515 A | 10/1999 | Oglesbee | |
| 6,121,758 A | 9/2000 | Bellina et al. | |
| 6,157,247 A | 12/2000 | Abdesselem et al. | |
| 6,208,127 B1 | 3/2001 | Doluca | |
| 6,356,615 B1 | 3/2002 | Coon et al. | |
| 6,369,557 B1 | 4/2002 | Agiman | |
| 6,405,353 B1 | 6/2002 | Maheshwari | |

(Continued)

FOREIGN PATENT DOCUMENTS

CN 1238843 A 12/1999

(Continued)

OTHER PUBLICATIONS

Yee William Li, et al., "Asynchronous Datapath with Software-Controlled On-Chip Adaptive Voltage Scaling for Multirate Signal Processing Applications", Proceedings of the Ninth International Symposium on Asynchronous Circuits and Systems (ASYNC'03), 2003 IEEE, 10 pages.

(Continued)

*Primary Examiner* — Thomas Lee
*Assistant Examiner* — Michael J Brown

(57) ABSTRACT

A system and method is disclosed for providing a plurality of hardware performance monitors for adaptive voltage scaling in an integrated circuit system that comprises a plurality of clock domains. Each hardware performance monitor is associated with one of the plurality of clock domains and provides a signal that measures a performance of its respective clock domain temperature, process corner and supply voltage. The difference between the measured performance and a nominal expected performance for each hardware performance monitor is determined. The largest of the plurality of difference signals is selected and used in an advanced power controller to provide adaptive voltage scaling for the integrated circuit system.

21 Claims, 4 Drawing Sheets

U.S. PATENT DOCUMENTS

| | | | |
|---|---|---|---|
| 6,415,388 | B1 | 7/2002 | Browning et al. |
| 6,424,184 | B1 | 7/2002 | Yamamoto et al. |
| 6,456,049 | B2 | 9/2002 | Tsuji |
| 6,498,321 | B1 | 12/2002 | Fulmer et al. |
| 6,535,735 | B2 | 3/2003 | Underbrink et al. |
| 6,548,991 | B1 | 4/2003 | Maksimovic et al. |
| 6,583,675 | B2 | 6/2003 | Gomez |
| 6,614,284 | B1 | 9/2003 | Beeman et al. |
| 6,657,467 | B2 | 12/2003 | Seki et al. |
| 6,664,775 | B1 | 12/2003 | Clark et al. |
| 6,697,767 | B2 | 2/2004 | Wang et al. |
| 6,700,422 | B2 | 3/2004 | Tang et al. |
| 6,708,312 | B1 | 3/2004 | Chiang et al. |
| 6,768,363 | B2 | 7/2004 | Yoo et al. |
| 6,868,503 | B1 | 3/2005 | Maksimovic et al. |
| 6,882,172 | B1 | 4/2005 | Suzuki et al. |
| 6,900,478 | B2 | 5/2005 | Miyagi |
| 6,944,780 | B1 | 9/2005 | Kranzen et al. |
| 7,024,568 | B2 | 4/2006 | Maksimovic et al. |
| 7,030,661 | B1 | 4/2006 | Doyle |
| 7,080,268 | B2 | 7/2006 | Mosley |
| 7,100,061 | B2 | 8/2006 | Halepete et al. |
| 7,106,040 | B1 | 9/2006 | Maksimovic et al. |
| 7,112,978 | B1 | 9/2006 | Koniaris et al. |
| 7,117,378 | B1 | 10/2006 | Maksimovic et al. |
| 7,120,804 | B2 | 10/2006 | Tschanz et al. |
| 7,157,889 | B2 | 1/2007 | Kernahan et al. |
| 7,180,322 | B1 | 2/2007 | Koniaris et al. |
| 7,228,242 | B2 | 6/2007 | Read et al. |
| 7,289,921 | B1 | 10/2007 | Salmi et al. |
| 7,301,378 | B2 | 11/2007 | Cao |
| 7,479,768 | B1 | 1/2009 | Salmi |
| 7,581,120 | B1 | 8/2009 | Hartman et al. |
| 2002/0114244 | A1 | 8/2002 | Kelly et al. |
| 2003/0071657 | A1 | 4/2003 | Soerensen et al. |
| 2003/0076183 | A1 | 4/2003 | Tam et al. |
| 2003/0093160 | A1 | 5/2003 | Maksimovic et al. |
| 2007/0139097 | A1* | 6/2007 | Yang .............................. 327/530 |

FOREIGN PATENT DOCUMENTS

| | | |
|---|---|---|
| CN | 100511098 C | 7/2009 |
| WO | WO 01/35200 A1 | 5/2001 |
| WO | WO 03/062972 A2 | 7/2003 |

OTHER PUBLICATIONS

Woonseok Kim, et al., "Preemption-Aware Dynamic Voltage Scaling in Hard Real-Time Systems", Proceedings of the 2004 International Symposium on Low Power-Electronics and Design (ISLPED'04), p. 393-398.

Sandeep Dhar, et al., "Switching Regulator with Dynamically Adjustable Supply Voltage for Low Power VLSI", IECON'01: The 27th Annual Conference of the IEEE Industrial Electronics Society, 2001, p. 1874-1879.

Mohamed Elgebaly, et al., "Variation-Aware Adaptive Voltage Scaling System," IEEE Transactions on Very Large Scale Integration (VLSI) Systems, vol. 15, No. 5, May 2007, p. 560-571.

Sandeep Dhar, et al., "Closed-loop Adaptive Voltage Scaling Controller for Standard-Cell ASICs," ISLPED'02, Aug. 12-14, 2002, 5 pages.

Hiroshi Okano, et al., "Supply Voltage Adjustment Technique for Low Power Consumption and its Application to SOCs with Multiple Threshold Voltage CMOS", 2006 Symposium on VLSI Circuits Digest of Technical Papers, 2 pages.

Jianfeng Huang, et al., "Power optimization in data-path scheduling and binding with multiple supply voltages and threshold voltages by simulated annealing", 2005 IEEE, p. 1370-1374.

Sandeep Dhar, et al., "Closed-Loop Adaptive Supply Voltage Scaling Controller for Low-Power Embedded Processors", 2005 IEEE Region 5 and IEEE Denver Section Technical, Professional and Student Development Workshop, p. 6-11.

W. Hung, et al., "Total Power Optimization through Simultaneously Multiple-VDD Multiple-VTH Assignment and Device Sizing with Stack Forcing", ISLPED '04, Aug. 9-11, 2004, p. 144-149.

Anirban Basu, et al., "Simultaneous Optimization of Supply and Threshold Voltages for Low-Power and High-Performance Circuits in the Leakage Dominant Era", DAC 2004, Jun. 7-11, 2004. p. 884-887.

S. Thompson, et al., "Dual Threshold Voltages and Substrate Bias: Keys to High Performance, Low Power, 0.1 µm Logic Designs", 1997 Symposium on VLSI Technology Digest of Technical Papers, p. 69-70.

A. Bassi, et al., "Measuring the effects of process variations on circuit performance by means of digitally-controllable ring oscillators", 2003 IEEE, p. 214-217.

Pasi Salmi, et al., "System and Method for Rapidly Increasing a Rising Slew Rate of an Adjustable Supply Voltage in Adaptive Voltage Scaling", U.S. Appl. No. 11/138,037, filed May 26, 2005.

Michael J. Dong, et al., "Low Power Signal Processing Architectures for Network Microsensors", 1997, ACM Publication, p. 173-177.

Roy H. Liu, "Multi-voltage Adaptive Voltage Scaling SoC Reference Design", National Semiconductor Corporation, Nov. 15, 2006, p. 1-8.

Juha Pennanen, et al., "System and Method for Providing Hardware Performance Monitors for Adaptive Voltage Scaling With a Plurality of VT Logic Libraries", U.S. Appl. No. 11/712,709, filed Mar. 1, 2007.

* cited by examiner

SYSTEM AND METHOD FOR PROVIDING ADAPTIVE VOLTAGE SCALING WITH MULTIPLE CLOCK DOMAINS INSIDE A SINGLE VOLTAGE DOMAIN

CROSS REFERENCE TO RELATED APPLICATION

The present invention is related to a United States Patent Application by the same inventors entitled "System and Method for Providing Hardware Performance Monitors for Adaptive Voltage Scaling With a Plurality of $V_T$ Logic Libraries" that was filed on Mar. 1, 2007 with patent application Ser. No. 11/712,709.

TECHNICAL FIELD OF THE INVENTION

The present invention relates generally to low power integrated circuits and, more particularly, to low power integrated circuits that employ adaptive voltage scaling and operate with a plurality of clock domains inside a single voltage domain.

BACKGROUND OF THE INVENTION

Modern digital integrated circuits such as central processing units (CPUs) are typically capable of operating with several different clock frequencies. Assume that a CPU can reduce its clock frequency while still meeting the processing requirements of an application that is running on the CPU. As is well known, a reduction in the clock frequency of the CPU proportionally reduces the CPU power consumption. With a lower clock frequency less power is consumed because there are fewer signal level changes within a given time period.

As is also well known, the power consumption of a digital circuit is quadratically proportional to the operating voltage. Therefore, decreasing the voltage level of the operating voltage (i.e., the supply voltage) and reducing the clock frequency can provide significant power savings in a digital circuit.

Dynamic Voltage Scaling (DVS) is a power management technique in which pre-determined voltage values (within a voltage table) are used for each requested operating clock frequency of a CPU. The voltage levels that are defined in the voltage table must be carefully selected in order to adequately cover all process and temperature corners so that the CPU will function correctly at each clock frequency.

Adaptive Voltage Scaling (AVS) is a power management technique in which the supply voltage of a digital integrated circuit is adjusted automatically. The supply voltage is adjusted using closed loop feedback to a minimum level that is required for the proper operation of the integrated circuit at a given clock frequency.

The major difference between Dynamic Voltage Scaling (DVS) and Adaptive Voltage Scaling (AVS) is that the Adaptive Voltage Scaling (AVS) automatically measures variation of the process and temperature in order to balance the supply voltage and system delay (digital cell delay) that is due to closed loop feedback. This means that the supply voltage in the AVS system is automatically reduced at lower temperatures and for faster silicon. As the supply voltage is reduced, the power consumption is also reduced.

FIG. 1 illustrates a block diagram of an embodiment of an exemplary prior art Adaptive Voltage Scaling (AVS) system 100. AVS system 100 comprises a System-on-a-Chip (SoC) unit 110 and an Energy Management Unit (EMU) 120. The System-on-a-Chip (SoC) unit 110 comprises a Clock Management Unit (CMU) 130, a Variable Voltage Domain CPU System 140, a Hardware Performance Monitor (HPM) 150, and an Advanced Power Controller (APC) 160. The Hardware Performance Monitor (HPM) 150 is located within the Variable Voltage Domain CPU System 140.

The Clock Management Unit (CMU) 130 receives a system clock signal from a system clock unit (not shown in FIG. 1). The Clock Management Unit (CMU) 130 provides clock frequencies for the central processing unit (CPU) (also not shown in FIG. 1). The Clock Management Unit (CMU) 130 also provides clock frequencies for the Hardware Performance Monitor (HPM) 150. The clock frequencies that are provided to the Hardware Performance Monitor (HPM) 150 are represented by the designation HPM CLOCK.

The Hardware Performance Monitor (HPM) 150 tracks gate delays in the current operational conditions. The CPU system and the Hardware Performance Monitor (HPM) 150 are in the Variable Voltage Domain CPU System 140. The Hardware Performance Monitor (HPM) 150 outputs a performance code to the Advanced Power Controller (APC) 160. The performance code indicates the propagation delay of digital gate cells. The Advanced Power Controller (APC) 160 processes the delay data and requests appropriate changes to the supply voltage.

The Advanced Power Controller (APC) 160 is coupled to and communicates with the Energy Management Unit (EMU) 120. In one embodiment the coupling between the Advanced Power Controller (APC) 160 and the Energy Management Unit (EMU) 120 is a PowerWise® interface (PWI). The mark PowerWise® is a registered trademark of the National Semiconductor Corporation. The Advanced Power Controller (APC) 160 sends a request to the Energy Management Unit (EMU) 120 to change the supply voltage. The Energy Management Unit (EMU) 120 provides the requested supply voltage level to the System-on-a-Chip (SoC) 110. The adjustable supply voltage from the Energy Management Unit (EMU) 120 is designated $V_{AVS}$ in FIG. 1.

The operating system of a modern central processing unit (CPU) may support a real time scheduling of performance levels. Each performance level may have associated with it a specific value of operating clock frequency. The operating system is capable of selecting an operating clock frequency for which the CPU performance is minimized on a real time basis and for which the deadlines of a particular application are still met. For example, while an MPEG4 movie encoding application is running, a performance scheduling algorithm of the operating system may predict and change the performance level of the CPU in ten millisecond (10 ms) intervals.

The Hardware Performance Monitor (HPM) 150 tracks gate delays in the current operational conditions. The Hardware Performance Monitor (HPM) 150 outputs a performance code to the Advanced Power Controller 160. The performance code indicates the propagation delay of digital gate cells. In particular, Hardware Performance Monitor (HPM) 150 sends the performance code to the Advanced Power Controller 160. The Advanced Power Controller 160 then subtracts the performance code from a standard Reference Calibration Code (RCC) to obtain an error signal.

The error signal is referred to as "Slack Time". The Slack Time error signal comprises a digital error signal in a two's complement number format. If the Slack Time is positive an increase in voltage is required. If the Slack Time is negative a decrease in voltage is required. The Slack Time error signal is provided to a Compensation Unit (not shown) within the Advanced Power Controller 160. Based on the value of the Slack Time error signal, the Compensation Unit sends a signal to the Energy Management Unit (EMU) 120 to cause the Energy Management Unit (EMU) 120 to adjust the value of the adjustable output voltage ($V_{AVS}$) of Energy Management Unit (EMU) 120.

Modern System-on-a-Chip (SoC) digital logic circuits may consume large amounts of power both in terms of leakage power and dynamic power. Leakage power is the power that is consumed when no switching activity occurs within the logic circuitry. Dynamic power is the power that is consumed by the logic circuitry to alter its internal states (e.g., charging and discharging internal nodes).

When a closed loop adaptive voltage scaling system of the type illustrated in FIG. 1 minimizes the supply voltage, both the dynamic power and the leakage power are minimized. The expression for the power of the System-on-a-Chip (Soc) is given by the expression:

$$P = \alpha C V^2 f_{CLK} + V I_L \qquad \text{Eq. (1)}$$

P is the total power of the System-on-a-Chip (SoC). Alpha ($\alpha$) is a switching activity factor. Alpha ($\alpha$) represents the percentage of nodes that are switching at each clock cycle. C is the node capacitance inside the SoC. The expression $f_{CLK}$ is the SoC clock frequency. V is the supply voltage. The expression $I_L$ is the leakage current. Equation (1) assumes rail-to-rail switching for the CMOS logic.

In modern implementations of System-on-a-Chip (SoC) systems there are multiple independent functional blocks. These blocks may include general purpose processor cores, digital signal processing (DSP), and hardware accelerators for specific functions like Digital Video Broadcasting-Handheld (DVB-H) reception, encoding and decoding in MPEG 2/MPEG 4/VC1 video standards, baseband processing and the like. The multiple independent functional hardware blocks are used for different functions because it is much more efficient in terms of power consumption to use a hardware implementation rather than a software implementation. For example, DVB-H decoding that is performed in a dedicated hardware block is more efficient in terms of power consumption than DVB-H decoding that is performed using software running in a central processing unit (CPU).

In addition, the individual multiple independent functional hardware blocks are activated only when they are needed. When they are not required, the individual multiple independent functional hardware blocks remain inactive to reduce power consumption.

There are several independent functional hardware blocks inside a System-on-a-Chip (SoC) system. Each hardware block has its own characteristic usage requirements and operating frequencies (which may also be variable frequencies). Each of the hardware blocks can further reduce its power consumption by using techniques like Dynamic Voltage Scaling (DVS) and Adaptive Voltage Scaling (AVS). This requires that an Adaptive Voltage Scaling (AVS) system 100 of the type that is shown in FIG. 1 be implemented in parallel for each independent functional hardware blocks inside the System-on-a-Chip (SoC) system. This type of arrangement provides an optimal supply voltage for each of the independent functional hardware blocks.

However, there are two main disadvantages with this approach. First, the number of required adjustable voltage regulators (and associated external components) may be too large. That is, the number of circuit elements that are required to implement this solution may be too large for this solution to be feasible in a size-constrained portable device. Second, even if the size and complexity problems could be overcome, the cost of all of the required hardware may be too great for a particular application.

Therefore, there is a need in the art for a system and method that allows a system architect to define an optimum balance between power efficiency and the number of independent voltage domains (and associated adjustable voltage regulators and their external components) in terms of size and cost while optimizing the power consumption of a complex, multi-function System-on-a-Chip (SoC) system. There is a need in the art for a system and method that is capable of efficiently providing accurate adaptive voltage scaling (AVS) for a System-on-a-Chip (SoC) system that operates with a plurality of clock domains inside a single voltage domain.

SUMMARY OF THE INVENTION

To address the above-discussed deficiencies of the prior art, it is a primary object of the present invention to provide a system and method for efficiently providing accurate adaptive voltage scaling (AVS) for a System-on-a-Chip (SoC) system that operates with a plurality of clock domains inside a single voltage domain.

In an advantageous embodiment of the present invention the adaptive voltage scaling (AVS) system comprises a plurality of Hardware Performance Monitors (HPMs) for use with an Advanced Power Controller (APC) loop control unit and a System-on-a-Chip (SoC). Each Hardware Performance Monitor (HPM) is associated with one of a plurality of functional blocks. Each functional block comprises a separate clock domain.

Each Hardware Performance Monitor (HPM) provides a signal that measures a performance of its respective functional block die temperature, process corner and supply voltage. The difference between the measured performance and a nominal expected performance for each Hardware Performance Monitor (HPM) is determined. Then the largest of the plurality of difference signals is selected and used in the Advanced Power Controller (APC) loop control unit to provide adaptive voltage scaling for the system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 2:
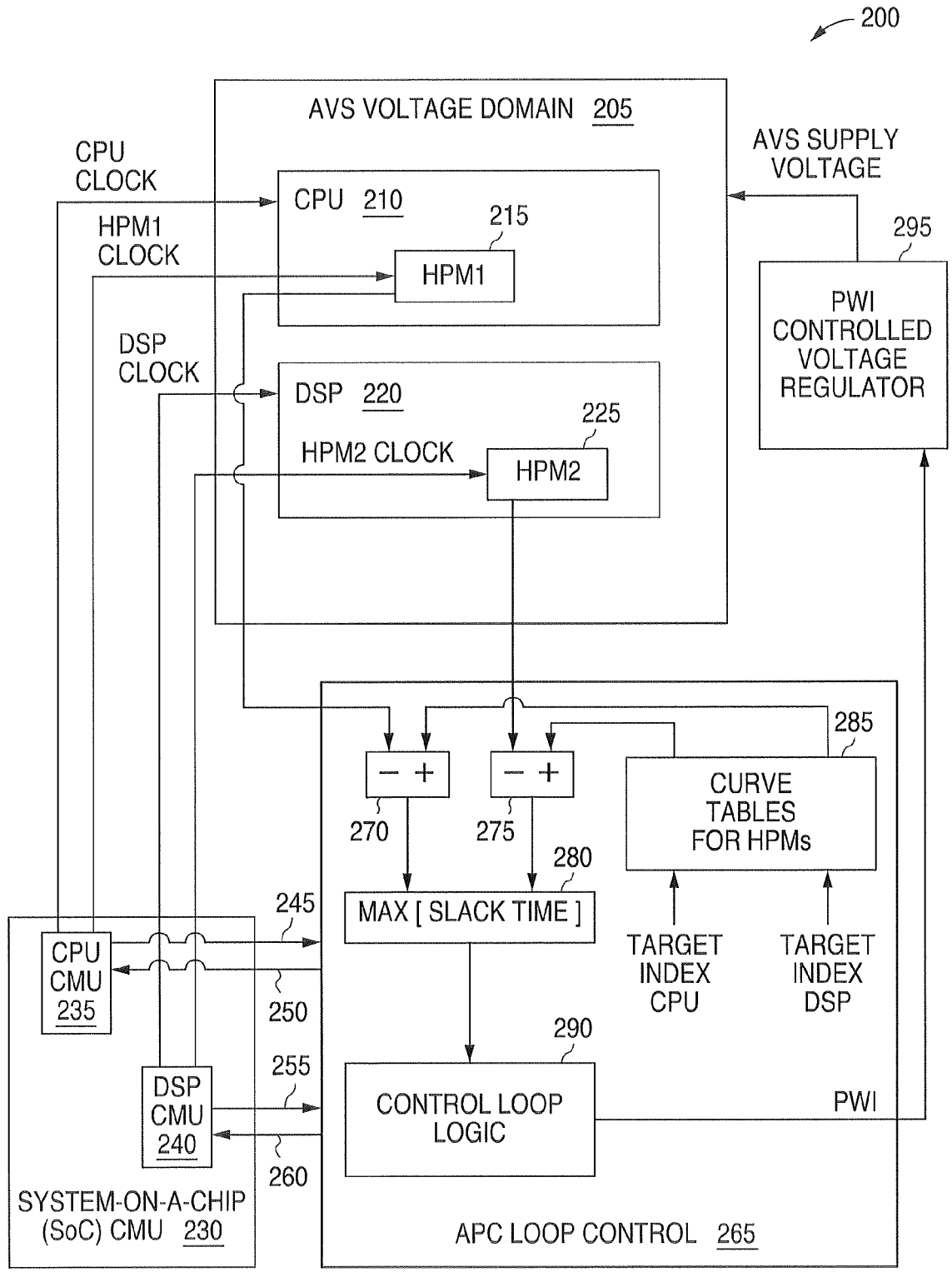
FIG. 2 is a block diagram illustrating an advantageous embodiment of the present invention showing an adaptive voltage scaling system for a System-on-a-Chip (SoC) system that operates with two clock domains inside a single voltage domain.
Figure 3:
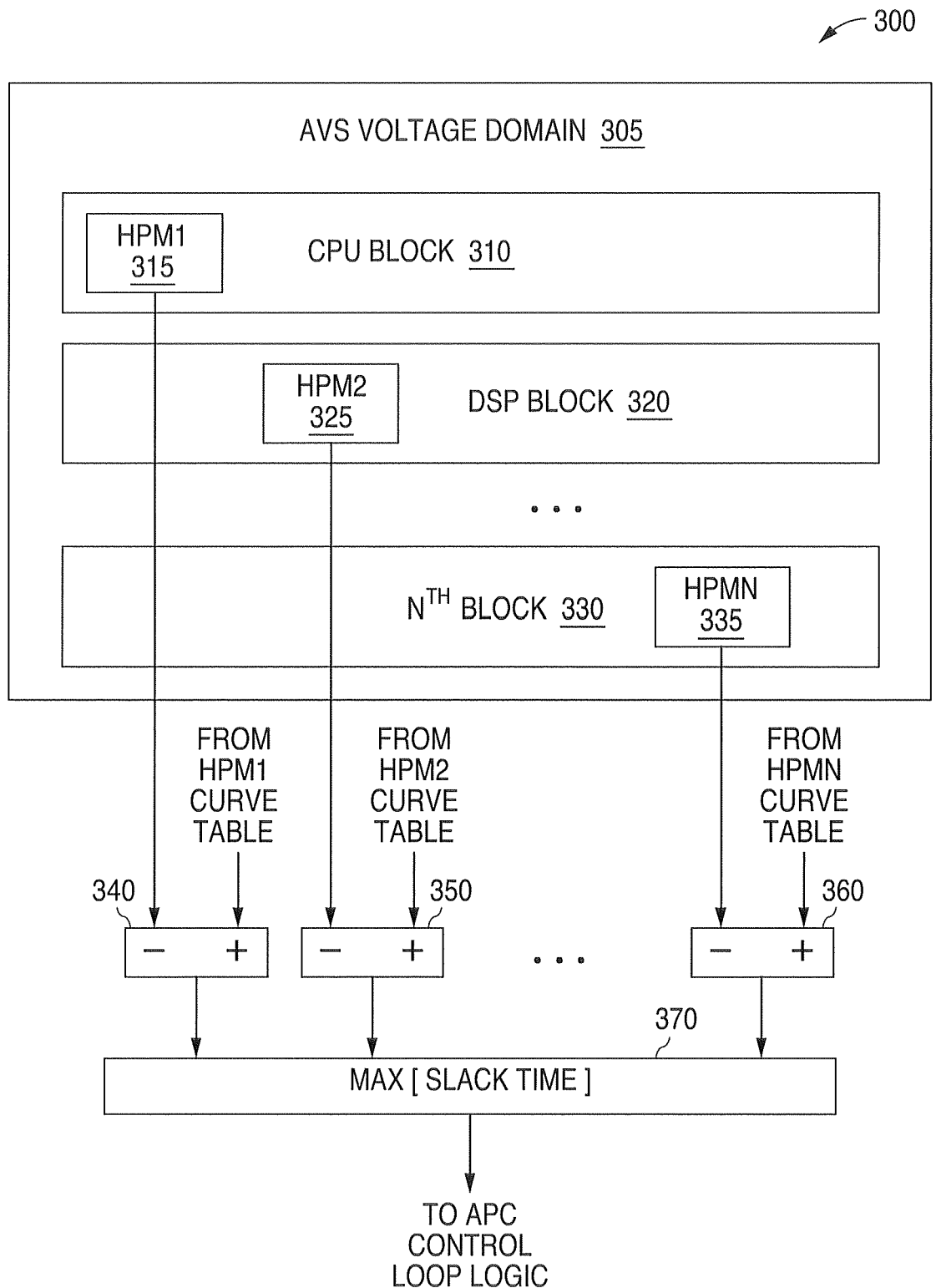
FIG. 3 is a block diagram illustrating an advantageous embodiment of the present invention showing a portion of an adaptive voltage scaling system for a System-on-a-Chip (SoC) system that operates with a plurality of clock domains inside a single voltage domain.
Figure 4:
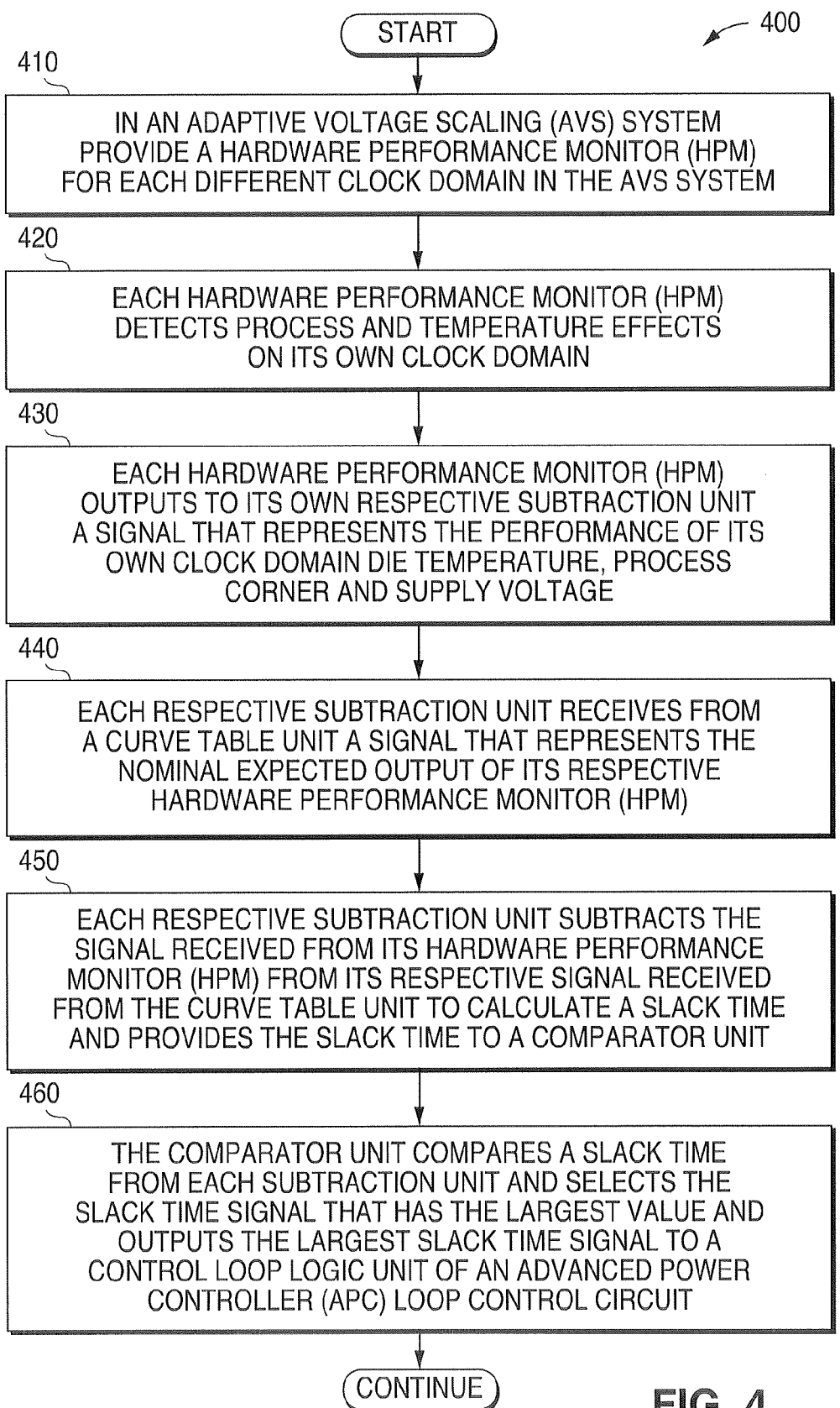
FIG. 4 is a flow chart illustrating an advantageous embodiment of a method of the invention.

FIGS. 2 through 4 and the various embodiments used to describe the principles of the present invention in this patent document are by way of illustration only and should not be construed in any way to limit the scope of the invention. Those skilled in the art will understand that the principles of the present invention may be implemented in any type of suitably arranged adaptive voltage scaling system.

The present invention solves the problems that exist in the prior art by connecting a plurality of Hardware Performance Monitors (HPMs) to the control loop of the adaptive voltage scaling (AVS) system. One Hardware Performance Monitor (HPM) is provided for each different clock domain in the system. For example, in the case of a system with two clock domains, two Hardware Performance Monitors (HPMs) are provided. The first Hardware Performance Monitor (HPM1) is provided for the first clock domain and the second Hardware Performance Monitor (HPM2) is provided for the second clock domain. Three Hardware Performance Monitors (HPMs) are provided for designs that have three different clock domains, and so on.

The present invention enables a system architect to implement and manage the supply voltage of an adaptive voltage domain that includes multiple functional blocks that may be independently frequency scaled. The ability to combine, if needed, multiple functional blocks (with independent clock domains) into a large Adaptive Voltage Scaling (AVS) domain allows the system architect to make trade offs between system size and cost versus power efficiency. At the same time, independent frequency selection for each functional block within the Adaptive Voltage Scaling (AVS) domain allows optimization of the operating frequency of each function. This provides optimization of system performance and power consumption.

For example, a large, high-power function that is often used might be allocated a first independent Adaptive Voltage Scaling (AVS) domain to minimize its power consumption. At the same time, several auxiliary functions might be combined in a second shared voltage domain with a second shared Adaptive Voltage Scaling (AVS) power supply in order to reduce the system size and cost.

If the functions of the second shared Adaptive Voltage Scaling (AVS) domain are rarely used together, then the overall power efficiency of the system can still be close to that of a system that has an independent Adaptive Voltage Scaling (AVS) domain for each function. In an extreme case where the multiple functions in the second shared Adaptive Voltage Scaling (AVS) domain are never used at the same time, this arrangement is as power efficient (for dynamic power consumption) as having a dedicated power supply for each function, but at a cost of (1/N) of the regulator hardware cost, where N is the number of functional blocks within the Adaptive Voltage Scaling (AVS) domain.

For an Adaptive Voltage Scaling (AVS) domain that is shared by more than one functional block, a system and method is needed to determine a supply voltage that is adequate for all of the functional blocks. FIG. 2 is a block diagram illustrating an advantageous embodiment 200 of the present invention that comprises two such functional blocks. The two functional blocks in the Adaptive Voltage Scaling (AVS) domain 205 of FIG. 2 are a central processing unit (CPU) 210 and a digital signal processing (DSP) unit 220. Each functional block comprises a separate clock domain. Although the principles of the present invention will be described with reference to two functional blocks, it is understood that the present invention is not limited to two functional blocks. It is understood that in the present invention any number of functional blocks may be implemented inside an Adaptive Voltage Scaling (AVS) domain.

Figure 1:
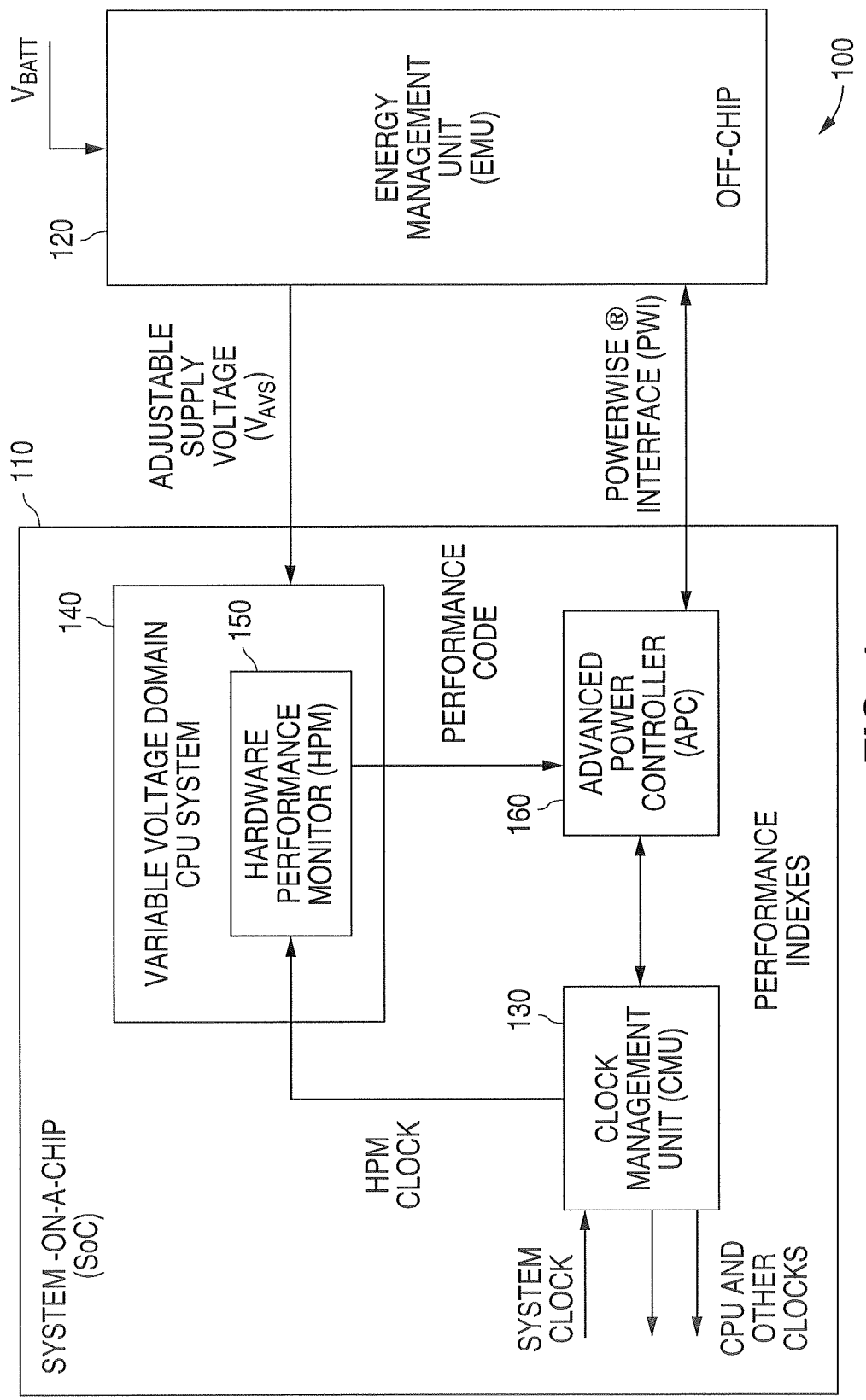
FIG. 1 is a block diagram illustrating an exemplary prior art adaptive voltage scaling (AVS) system.

The advantageous embodiment 200 of the present invention comprises a System-on-a-Chip (SoC) Clock Management Unit (CMU) 230. SoC CMU 230 comprises a CPU Clock Management Unit (CMU) 235 and a Digital Signal Processing (DSP) Clock Management Unit (CMU) 240. The CPU CMU 235 and the DSP CMU 240 are each functionally equivalent to the Clock Management Unit (CMU) 130 that is shown in FIG. 1 for the prior art System-on-a-Chip (SoC) 110. The CPU CMU 235 and the DSP CMU 240 are each fully independent. The operating frequencies of the CPU CMU 235 may be adjusted without regard to the operating frequencies of the DSP CMU 240. Similarly, the operating frequencies of the DSP CMU 240 may be adjusted without regard to the operating frequencies of the CPU CMU 235.

The central processing unit (CPU) 210 in the AVS voltage domain 205 comprises a first Hardware Performance Monitor (HPM1) 215. The digital signal processing (DSP) unit 220 in the AVS voltage domain 205 comprises a second Hardware Performance Monitor (HPM2) 225.

As shown in FIG. 2, the CPU 210 receives a CPU reference clock signal (CPU CLOCK) from the CPU Clock Management Unit (CMU) 235 within the System-on-a-Chip (SoC) Clock Management Unit (CMU) 230. The first Hardware Performance Monitor (HPM1) 215 also receives a first HPM reference clock signal (HPM1 Clock) from the CPU Clock Management Unit (CMU) 235 within the System-on-a-Chip (SoC) Clock Management Unit (CMU) 230.

The DSP unit 220 receives a DSP reference clock signal (DSP CLOCK) from the DSP Clock Management Unit (CMU) 240 within the System-on-a-Chip (SoC) Clock Management Unit (CMU) 230. The second Hardware Performance Monitor (HPM2) 225 also receives a second HPM reference clock signal (HPM2 Clock) from the DSP Clock Management Unit (CMU) 240 within the System-on-a-Chip (SoC) Clock Management Unit (CMU) 230.

The first Hardware Performance Monitor (HPM) 215 and the second Hardware Performance Monitor (HPM) 225 each produce an output that is relative to the performance of its respective die temperature, process corner and supply voltage. As will be described more fully below, the outputs of the two Hardware Performance Monitors (215 and 225) are compared in real time to their respective nominal expected outputs. The Hardware Performance Monitor whose output indicates a requirement for a higher supply voltage is used to control the voltage regulator of the AVS system (i.e., the PWI Controlled Voltage Regulator 295).

As shown in FIG. 2, the output of the first Hardware Performance Monitor (HPM1) 215 and the output of the second Hardware Performance Monitor (HPM2) 225 are provided to the Advanced Power Controller (APC) loop control unit 265. As will be more fully described the APC loop control unit 265 (1) receives "target index" values from the System-on-a-Chip (Soc) CMU 230 for each of the two functional blocks, and (2) receives performance data from the output of the first Hardware Performance Monitor (HPM1) 215 and the output of the second Hardware Performance Monitor (HPM2) 225, and (3) produces output voltage commands for the PWI Controlled Voltage Regulator 295, and (4) produces "current index" values for the CPU Clock Management Unit (CMU) 235 and the DSP Clock Management Unit 240 within the System-on-a-Chip (SoC) Clock Management Unit (CMU) 230. The "current index" values indicate which clock frequency can be safely used inside the AVS voltage domain 205.

As shown in FIG. 2, the CPU CMU 235 provides a target index value (designated Target Index CPU) to the APC loop control unit 265 via signal line 245. The CPU CMU 235 receives a current index value (designated Current Index CPU) from the APC loop control unit 265 on signal line 250. The DSP CMU 240 provides a target index value (designated Target Index DSP) to the APC loop control unit 265 via signal line 255. The DSP CMU 240 receives a current index value (designated Current Index DSP) from the APC loop control unit 265 on signal line 260.

The PWI Controlled Voltage Regulator 295 receives voltage values via the PowerWise® interface (PWI) from the control loop logic unit 290 of the APC loop control unit 265. The PWI Controlled Voltage Regulator 295 produces an output voltage (designated AVS supply voltage) as directed by the incoming voltage value from the APC loop control unit 265. The PWI Controlled Voltage Regulator 295 typically comprises an external integrated circuit (IC) that is located outside of the System-on-a-Chip (Soc) system. However, it is also possible to implement the PWI Controlled Voltage Regulator 295 on the same SoC die or in the same package. All of the variations are functionally equivalent. The PWI Controlled Voltage Regulator 295 provides the AVS supply voltage to the AVS domain 205 via a supply rail or a pin on the SoC chip.

Because the Adaptive Voltage Scaling (AVS) loop has only a single common supply voltage, the data from the two Hardware Performance Monitors (HPM1 215 and HPM2 225) has to be used to determine which functional block (CPU or DSP) requires a higher supply voltage. The overall voltage level is determined based on the more critical block just as if only a single functional block existed inside the Adaptive Voltage Scaling (AVS) domain 205.

Each Clock Management Unit (CMU) (i.e., CPU CMU 235 and DSP CMU 240) provides its respective reference clock signal (HPM1 Clock and HPM2 Clock) to its respective Hardware Performance Monitor (HPM1 and HPM2) inside the functional block that the Clock Management Unit (CMU) controls. Each Hardware Performance Monitor outputs a code relative to the performance of the logic in its respective functional block.

These codes are compared to expected values for those operating frequencies. The code that indicates the lowest level of performance (relative to the required performance) is used as a control input by the APC loop control unit 265 to adjust the supply voltage.

The CPU 210 and the DSP unit 220 are able to share the same Adaptive Voltage Scaling (AVS) domain 205 because of steps that are taken by the APC loop control unit 265 based on information from the two Hardware Performance Monitors (HPM1 215 and HPM2 225). APC loop control unit 265 comprises a curve table unit 285 that comprises a first "curve table" that stores the expected output of the first Hardware Performance Monitor (HPM1 215) at each operating frequency of the CPU 210. The output of the first Hardware Performance Monitor (HPM1 215) is subtracted from the value obtained from the first "curve table."

Curve table unit 285 also comprises a second "curve table" that stores the expected output of the second Hardware Performance Monitor (HPM2 225) at each operating frequency of the DSP unit 220. The output of the second Hardware Performance Monitor (HPM2 225) is subtracted from the value obtained from the second "curve table."

In the case of two independent functional blocks (i.e., two independent clock domains) within a single Adaptive Voltage Scaling (AVS) domain 205, there must be a separately maintained curve table for each of the two blocks. For each of the two blocks, a value that corresponds to a desired operating frequency (indicated by the "target index" value) is fetched from the curve table and compared to the Hardware Performance Monitor output to compute an output signal (referred to as a "Slack Time").

The output of the first Hardware Performance Monitor (HPM1 215) is provided to a first subtraction unit 270. First subtraction unit 270 also receives a value that represents the nominal expected output of the first Hardware Performance Monitor (HPM1 215) from the curve table unit 285. Curve table unit 285 contains the nominal expected values for first Hardware Performance Monitor (HPM1 215). A value of the target index for the CPU is provided to the curve table unit 285 from the CPU CMU 235.

As also shown in FIG. 2, the output of the second Hardware Performance Monitors (HPM2 225) is provided to second subtraction unit 275. Second subtraction unit 275 also receives a value that represents the nominal expected output of the second Hardware Performance Monitor (HPM2 225) from curve table unit 285. Curve table unit 285 contains the nominal expected values for second Hardware Performance Monitor (HPM2 225). A value of the target index for the DSP is provided to the curve table unit 285 from the DSP CMU 240.

The first subtraction unit 270 subtracts the output of the first Hardware Performance Monitor (HPM1 215) from the nominal expected output of the first Hardware Performance Monitor (HPM1 215) from curve table unit 285. The output of the first subtraction unit 270 (designated as "first Slack Time") is provided to a comparator unit 280 (designated MAX [SLACK TIME] in FIG. 2).

The second subtraction unit 275 subtracts the output of the second Hardware Performance Monitor (HPM2 225) from the nominal expected output of the second Hardware Performance Monitor (HPM2 225) from curve table unit 285. The output of the second subtraction unit 275 (designated as "second Slack Time") is also provided to the comparator unit 280.

The result of the subtraction in the subtraction units (270 and 275) provides indirect information about the supply voltage level and the performance of the logic. A positive number for the Slack Time indicates an inadequate supply voltage for the current operating frequency. A negative number for the Slack Time indicates an excessive supply voltage. The magnitude of the Slack Time indicates the size of the voltage error. By taking the larger of the two "Slack Time" signals, the APC loop control unit 265 can adjust the supply voltage for both the CPU 210 and the DSP unit 220. The block that requires the higher supply voltage sets the final voltage level. The block that requires the lower supply voltage will actually receive a higher than optimal supply voltage level.

Unless both blocks need exactly the same voltage level to run at a desired frequency, one of the two blocks will not be fully optimized. However, the savings in system size and cost due to having to use fewer voltage regulators may be more important than this inefficiency. If only one of the blocks (CPU or DPS) is active at a time, the supply voltage is optimal for the block that is active.

Comparator unit 280 compares in real time the value of the first Slack Time from the first subtraction unit 270 and the value of the second Slack Time from the second subtraction 275. Comparator unit 280 selects the Slack Time signal from the subtraction unit that has the larger value. The comparator unit 280 then outputs the selected Slack Time signal to the control loop logic unit 290 of the Advanced Power Controller (APC) loop control unit 265.

From this point the adaptive voltage scaling (AVS) system works in exactly the same manner as in the case of a single Hardware Performance Monitor (HPM) operating with a single functional block. The Advanced Power Controller (APC) loop control unit 265 provides the PowerWise® interface (PWI) signal to PWI Controlled Voltage Regulator 295.

The Advanced Power Controller (APC) loop control unit 265 also provides the Current Index CPU to the CPU Clock Management Unit (CMU) 235 via signal line 250. The Advanced Power Controller (APC) loop control unit 265 also provides the Current Index DSP to the DSP Clock Management Unit (CMU) 240 via signal line 260. The Advanced Power Controller (APC) loop control unit 265 also receives the Target Index CPU from the CPU Clock Management Unit (CMU) 235 via signal line 245. The Advanced Power Controller (APC) loop control unit 265 also receives the Target Index DSP from the DSP Clock Management Unit (CMU) 240 via signal line 255.

When the clock frequency for one of the two functional blocks (CPU or DSP) is changed, the corresponding Clock Management Unit (CMU) first updates the respective Target Index and HPM clock frequency to the new value. The APC loop control unit 265 sees the change in the Target Index relative to the Current Index and realizes that a frequency change has been requested. The APC loop control unit 265 will also see that the output of the corresponding Hardware Performance Monitor (HPM) has changed because the HPM clock frequency has changed. Inside the APC loop control unit 265 a new reference value is fetched from the respective curve table based on the new Target Index.

Note that if both (or multiple) clock frequency changes occur simultaneously, then the HPM clocks, Target Indexes, and reference values are updated for all of them in parallel.

After the initial updates, the APC loop control unit 265 will monitor the maximum of the "Slack Times." Based on the history, sign and magnitude of the "Slack Time," the APC loop control unit 265 will adjust the AVS supply voltage using the PWI Controlled Voltage Regulator 295 until the "Slack Time" is negative. A negative "Slack Time" indicates that the supply voltage is adequate for all the functional blocks inside the AVS voltage domain 205.

Note that due to the independent parallel nature of the functional blocks (CPU and DSP) inside the AVS voltage domain 205 (and their independent clock frequencies), there may not always be a voltage change after a frequency change. A voltage change only occurs (1) if the functional block that requires more voltage than the other functional block changes frequency, or (2) if the functional block becomes (or ceases to be) the functional block that requires the highest voltage after the voltage change. Because the APC loop control unit 265 operates using the maximal "Slack Time" as its input, the APC loop control unit 265 will automatically adjust the supply voltage so that all blocks have an adequate supply voltage.

After the APC loop control unit 265 adjusts the supply voltage to the correct level, the APC loop control unit 265 grants the new frequency by updating the Current Index to be the same as the Target Index. This will (1) cause the CPU CMU 235 to enable the new CPU clock as needed, or (2) cause the DSP CMU 240 to enable the new DSP clock as needed.

The advantageous embodiment 200 of the present invention enables two independent clock domains (CPU 210 and DSP unit 220) to share a common Adaptive Voltage Scaling (AVS) domain 205 and have their supply voltage optimized in a closed loop so that the two clock domains can safely operate at their chosen frequencies.

An advantageous embodiment of the present invention has been described for the case of a two independent functional blocks (CPU and DSP). However, it is understood that the present invention is not limited to use with two independent functional blocks and that any number of independent functional blocks may be implemented. This principle is illustrated in FIG. 3.

FIG. 3 is a block diagram illustrating an advantageous embodiment 300 of the present invention showing a portion of an Adaptive Voltage Scaling (AVS) system that comprises a plurality of independent functional blocks (310, 320, ..., 330) in an adaptive voltage scaling (AVS) voltage domain 305. This embodiment comprises a plurality N of Hardware Performance Monitors (HPMs) (315, 325, ..., 335).

As shown in FIG. 3, the first Hardware Performance Monitor (HPM1 315) is associated with a CPU block 310. The second Hardware Performance Monitor (HPM2 325) is associated with a DSP block 320. The last (or Nth) Hardware Performance Monitor (HPMN 335) is associated with an $N^{TH}$ block 330.

The first Hardware Performance Monitor (HPM1 315) provides an output to a first subtraction unit 340. The first subtraction unit 340 also receives a value that represents the nominal expected output of the first Hardware Performance Monitor (HPM1 315) from an HPM1 curve table (not shown in FIG. 3).

The first subtraction unit 340 subtracts the output of the first Hardware Performance Monitor (HPM1 315) from the nominal expected output of the first Hardware Performance Monitor (HPM1 315) from the HPM1 curve table. The output of the first subtraction unit 340 is provided to a comparator unit 370 (designated MAX [SLACK TIME] in FIG. 3).

The second Hardware Performance Monitor (HPM2 325) provides an output to a second subtraction unit 350. The second subtraction unit 350 also receives a value that represents the nominal expected output of the second Hardware Performance Monitor (HPM2 325) from an HPM2 curve table (not shown in FIG. 3).

The second subtraction unit 350 subtracts the output of the second Hardware Performance Monitor (HPM2 325) from the nominal expected output of the second Hardware Performance Monitor (HPM2 325) from the HPM2 curve table. The output of the second subtraction unit 350 is provided to the comparator unit 370.

Lastly, the last (or Nth) Hardware Performance Monitor (HPMN 335) provides an output to a last (or Nth) subtraction table 360. The last subtraction unit 360 also receives a value that represents the nominal expected output of the last (or Nth) Hardware Performance Monitor (HPMN 335) from an HPMN curve table (not shown in FIG. 3).

The last subtraction unit 360 subtracts the output of the last (or Nth) Hardware Performance Monitor (HPMN 335) from the nominal expected output of the last (or Nth) Hardware Performance Monitor (HPMN 335) from the HPMN curve table. The output of the last subtraction unit 360 is provided to the comparator unit 370.

Comparator unit 370 compares in real time the first Slack Time value from the first subtraction unit 340 and the second Slack Time value from the second subtraction unit 350 and the Slack Time values from all the other subtraction units up to and including the last subtraction unit 360. Comparator unit 370 selects the Slack Time signal from the subtraction unit that has the largest value. The comparator unit 370 then outputs the selected Slack Time signal to an Advanced Power Controller (APC) control loop logic unit (not shown in FIG. 3). This embodiment illustrates that the present invention may employ any desired number of Hardware Performance Monitors (HPMs).

FIG. 4 is a flow chart 400 illustrating an advantageous embodiment of a method of the invention. In an adaptive voltage scaling (AVS) system a Hardware Performance Monitor (HPM) is provided for each different clock domain (i.e., functional block) in the AVS system (step 410). As previously described, each functional block comprises a separate clock domain. Each Hardware Performance Monitor (HPM) detects process and temperature effects on its own clock domain (step 420).

Each Hardware Performance Monitor (HPM) outputs to its own respective subtraction unit a signal that represents the performance of its own clock domain die temperature, process corner and supply voltage (step 430). Each respective subtraction unit receives from a curve table unit a signal that represents the nominal expected output of its respective Hardware Performance Monitor (HPM) (step 440).

Each respective subtraction unit subtracts the signal received from its Hardware Performance Monitor (HPM) from its respective signal received from the curve table unit to calculate a Slack Time and provides the Slack Time to a comparator unit (step 450). The comparator unit compares a Slack Time from each subtraction unit and selects the Slack Time signal that has the largest value and outputs the largest Slack Time signal to a control loop logic unit of an Advanced Power Controller (APC) loop control circuit (step 460). From this point the adaptive voltage scaling (AVS) system works in exactly the same manner as in the case of a single Hardware Performance Monitor (HPM) operating with a single clock domain.

Although the present invention has been described with several embodiments, various changes and modifications may be suggested to one skilled in the art. It is intended that the present invention encompass such changes and modifications as fall within the scope of the appended claims.

What is claimed is:

1. An apparatus for providing adaptive voltage scaling for an integrated circuit system, the apparatus comprising:
a plurality of subtraction units, wherein each subtraction unit has (i) a first input configured to be coupled to an output of an associated one of a plurality of hardware performance monitors and (ii) a second input configured to receive a signal representing an expected output of the associated hardware performance monitor, wherein each hardware performance monitor is associated with one of a plurality of clock domains; and
a comparator unit having a plurality of inputs coupled to outputs of the subtraction units, wherein the comparator unit is configured to (i) receive a plurality of output signals from the subtraction units, (ii) select a largest value signal from the output signals, and (iii) provide the largest value signal for use in providing the adaptive voltage scaling.

2. The apparatus as set forth in claim 1, wherein each subtraction unit is configured to receive at its first input a signal from its associated hardware performance monitor that is based on process and temperature effects for its associated clock domain.

3. The apparatus as set forth in claim 1, wherein the clock domains are associated with a central processing unit (CPU) and a digital signal processor (DSP).

4. The apparatus as set forth in claim 1, further comprising a curve table unit having an output coupled to the second input of each subtraction unit.

5. The apparatus as set forth in claim 4, wherein:
each subtraction unit is configured to receive on its first input a signal from its associated hardware performance monitor that represents a performance of its associated clock domain die temperature, process corner and supply voltage;
each subtraction unit is configured to receive on its second input the signal that represents the expected output of its associated hardware performance monitor from the curve table unit; and
each subtraction unit is configured to output an output signal that represents a difference between the signal on its second input and the signal on its first input.

6. The apparatus as set forth in claim 1, wherein the comparator unit is further configured to output the largest value signal.

7. The apparatus as set forth in claim 1, further comprising an advanced power controller control loop logic unit having an input that is coupled to an output of the comparator unit, wherein the advanced power controller control loop logic unit is configured to receive the largest value signal from the comparator unit for use in providing adaptive voltage scaling.

8. The apparatus as claimed in claim 1, wherein the apparatus comprises a first subtraction unit configured to be coupled to a first hardware performance monitor associated with a first clock domain and a second subtraction unit configured to be coupled to a second hardware performance monitor associated with a second clock domain.

9. An adaptive voltage scaling system, the adaptive voltage scaling system comprising:
a plurality of hardware performance monitors, wherein each hardware performance monitor is associated with one of a plurality of clock domains; and
a control unit comprising:
a plurality of subtraction units, wherein each subtraction unit has (i) a first input coupled to an output of an associated one of the hardware performance monitors and (ii) a second input configured to receive a signal representing an expected output of the associated hardware performance monitor; and a comparator unit having a plurality of inputs coupled to outputs of the subtraction units, wherein the comparator unit is configured to (i) receive a plurality of output signals from the subtraction units, (ii) select a largest value signal from the output signals, and (iii) provide the largest value signal for use in providing the adaptive voltage scaling.

10. The adaptive voltage scaling system as set forth in claim 9, wherein each hardware performance monitor is configured to detect process and temperature effects for its associated clock domain.

11. The adaptive voltage scaling system as set forth in claim 9, wherein the clock domains are associated with a central processing unit (CPU) and a digital signal processor (DSP).

12. The adaptive voltage scaling system as set forth in claim 9, wherein the control unit further comprises a curve table unit having an output coupled to the second input of each subtraction unit.

13. The adaptive voltage scaling system as set forth in claim 12, wherein:
each subtraction unit is configured to receive on its first input a signal from its associated hardware performance monitor that represents a performance of its associated clock domain die temperature, process corner and supply voltage;
each subtraction unit is configured to receive on its second input the signal that represents the expected output of its associated hardware performance monitor from the curve table unit; and
each subtraction unit is configured to output an output signal that represents a difference between the signal on its second input and the signal on its first input.

14. The adaptive voltage scaling system as set forth in claim 9, wherein the comparator unit is further configured to output the largest value signal.

15. The adaptive voltage scaling system as set forth in claim 9, wherein the control unit further comprises an advanced power controller control loop logic unit having an input that is coupled to an output of the comparator unit, wherein the advanced power controller control loop logic unit is configured to receive the largest value signal from the comparator unit for use in providing adaptive voltage scaling.

16. The adaptive voltage scaling system as claimed in claim 9, wherein the adaptive voltage scaling system comprises a first hardware performance monitor associated with a first clock domain and a second hardware performance monitor associated with a second clock domain.

17. A method for providing adaptive voltage scaling for an integrated circuit system, the method comprising the steps of:
receiving a plurality of HPM signals from a plurality of hardware performance monitors, wherein each hardware performance monitor is associated with one of a plurality of clock domains and monitors process and temperature effects for its associated clock domain;
for each HPM signal received from one of the hardware performance monitors, subtracting a signal representing an expected output of the associated hardware performance monitor from that HPM signal to generate one of multiple output signals;
selecting a largest value signal from the output signals; and
providing the largest value signal to a control unit for use in providing adaptive voltage scaling.

18. The method as set forth in claim 17, further comprising the step of:
for each hardware performance monitor, providing a value from a curve table unit as the signal representing the expected output of that hardware performance monitor.

19. The method as set forth in claim 18, wherein:
a plurality of subtraction units perform the subtraction step;
each subtraction unit receives on its first input the HPM signal from its associated hardware performance monitor that represents a performance of its associated clock domain die temperature, process corner and supply voltage; and
each subtraction unit receives on its second input the signal representing the expected output of its associated hardware performance monitor from the curve table unit.

20. The method as set forth in claim 17, wherein the curve table stores an expected output of each hardware performance monitor for each operating frequency of that hardware performance monitor's associated clock domain.

21. The method as set forth in claim 17, wherein the plurality of hardware performance monitors comprises a first hardware performance monitor associated with a first clock domain and a second hardware performance monitor associated with a second clock domain.

* * * * *